UNITED STATES PATENT OFFICE.

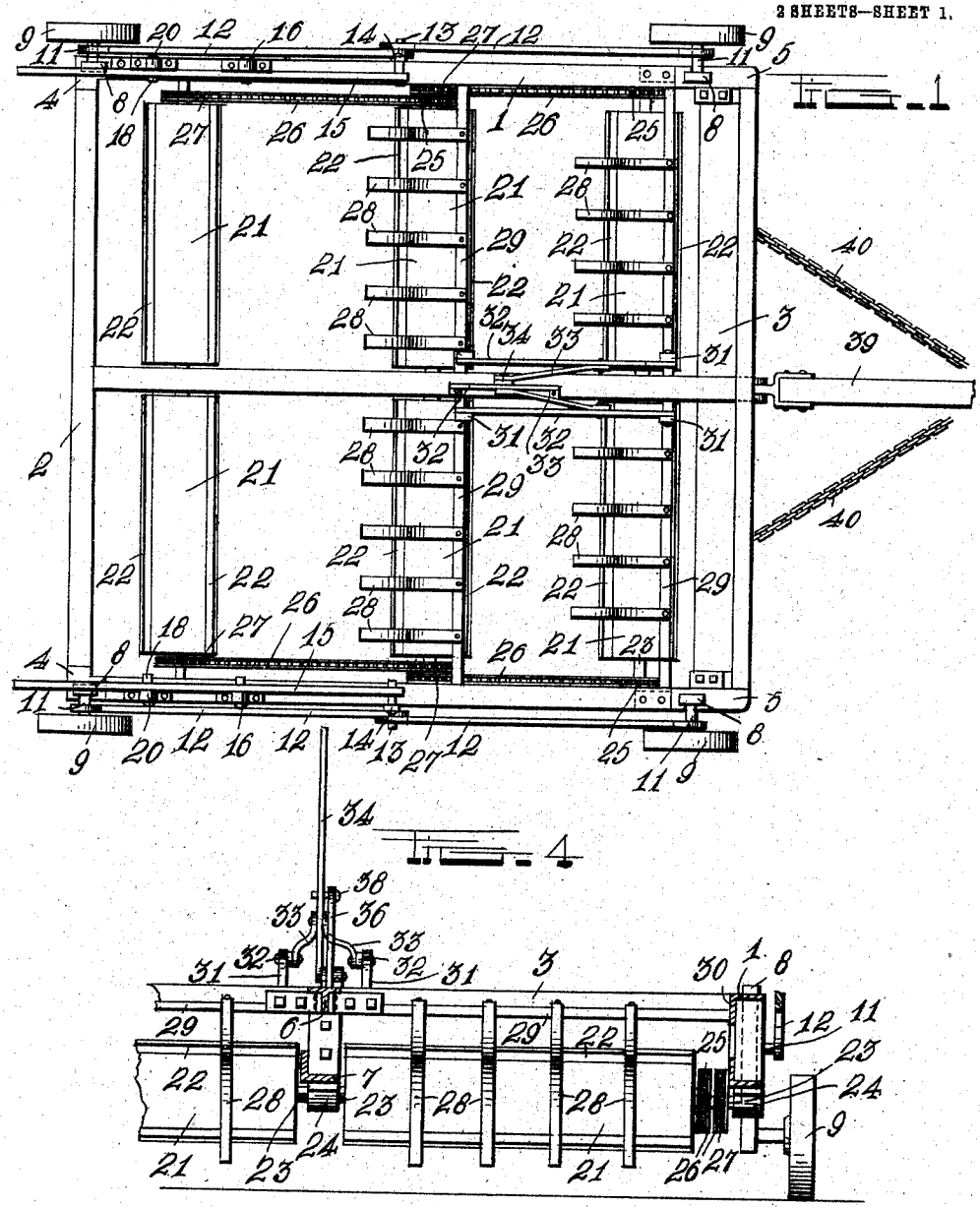

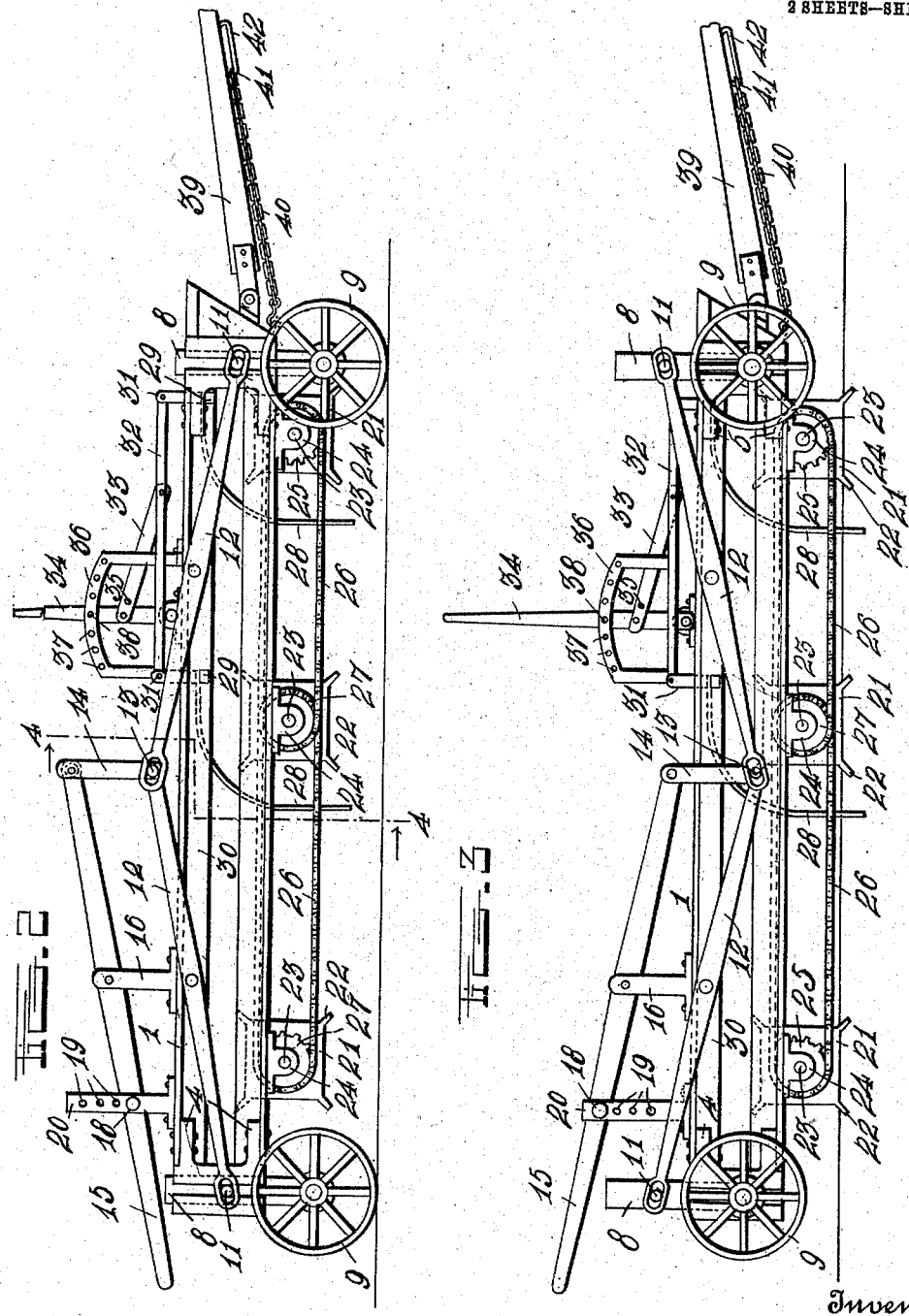

JASON S. DONNELLY, OF NEW LONDON, OHIO.

CLOD-CRUSHER.

966,890.  Specification of Letters Patent.  Patented Aug. 9, 1910.

Application filed February 3, 1910. Serial No. 541,687.

*To all whom it may concern:*

Be it known that I, JASON S. DONNELLY, a citizen of the United States, residing at New London, in the county of Huron and State of Ohio, have invented certain new and useful Improvements in Clod-Crushers; and I do declare the following to be a full, clear, and exact description of the invention, such as will enable other skilled in the art to which it appertains to make and use the same.

This invention relates to improvements in clod crushers.

One object of the invention is to provide a clod crusher having an improved construction of square crushing rollers provided with means for turning or throwing up the soil.

Another object is to provide a clod crusher of this character having supporting wheels adapted to be lowered and raised to bring the crushing rollers into and out of operative engagement with the ground.

A further object is to provide a clod crusher of this character having spring teeth adapted to drag the lumps and clods of soil up to the surface of the ground in position to be engaged and crushed by the rollers.

With the foregoing and other objects in view, the invention consists of certain novel features of construction, combination and arrangement of parts as will be more fully described and particularly pointed out in the appended claim.

In the accompanying drawings, Figure 1 is a top plan view of a clod crusher constructed in accordance with the invention; Fig. 2 is a side view of the same showing the clod crushing rollers in raised or inoperative position; Fig. 3 is a similar view showing the rollers in lowered or operative position; Fig. 4 is a vertical cross section on the line 4—4 of Fig. 2; Fig. 5 is an enlarged detail cross section of one of the clod crushing rollers.

In the embodiment of the invention I provide a supporting frame comprising pairs of angle iron side bars 1, a pair of rear angle iron cross bars 2, and a front cross bar or beam 3, which is preferably constructed of wood. The rear ends of the side bars 1 and the outer ends of the rear bars 2 are connected together by corner castings 4, while the front ends of the side bars and the front cross beam 3 are connected together by suitable castings 5, whereby said front cross bar is held at a slight angle or inclination, as shown. The rear cross bars 2 and the front cross bar 3 are connected together by a pair of centrally disposed connecting bars 6 and 7, the upper bar 6 of which is preferably T-shaped in cross section, while the lower bar is preferably formed of angle iron.

Slidably mounted in corner castings 4 and 5 are frame supporting posts or standards 8 on the lower ends of which are journaled frame supporting wheels 9, by means of which the frame of the machine is held up to support the crushing rollers above the ground or in an inoperative position. On the outer sides of the posts 8 are formed laterally projecting outwardly extending studs 11. With the studs 11 are engaged the slotted outer ends of wheel projecting and retracting bars 12, which are pivoted midway between their ends to the upper side bars 1 as shown. On the inner end of one of the bars 12 is formed a laterally projecting pivot stud 13 and an upwardly projecting arm 14. With the stud 13 is operatively engaged the slotted inner end of the other bar 12. To the upper end of the arms 14 are connected the inner ends of wheel operating levers 15, which are fulcrumed in suitable bearing posts 16 secured to the upper side bars of the frame as shown. The opposite or outer ends of the levers 15 project beyond the rear end of the frame and said ends are provided with an aperture 17 to receive a fastening pin 18, which is adapted to be engaged therewith and with one of a series of apertures 19 formed in locking standards 20 arranged on the upper side bars of the frame as shown. By means of the pins 17 and the apertured standards 20, the levers 15 may be locked in positions for holding the frame up in an elevated position on the wheeled posts or standards 8 as shown in Fig. 2 or in a lowered or operative position with the clod crushing rollers in engagement with the ground and the supporting wheels 9 in a raised or inoperative position as clearly shown in Fig. 3.

Arranged in the opposite sides of the frame are a series of clod crushing rollers 21, of which there may be any desired number, three of the same being shown in the present instance in each side of the frame. The rollers 21 are square or rectangular in cross section and are preferably formed of heavy sheet metal plates, the opposite edges of which are bent outwardly and riveted together, thus forming longitudinal diagonally projecting flanges 22, which are adapted to be engaged with the ground and which serve to turn or throw up the soil and to facilitate the pulverizing thereof by the sides of the rollers. The rollers 21 are provided with suitable ends on which are secured longitudinally extending bearing trunnions 23, which are engaged with suitable bearings 24 arranged on the lower side bars 1 and the lower central bar 7 of the frame. On the journals 23 of the outer ends of the front and rear rollers are fixedly mounted sprocket gears 25, which are connected by sprocket chains 26 to sprocket gears 27 on the outer ends of the journals of the intermediate rollers 21. By thus connecting the rollers, they will all be positively turned or operated by the contact of only one of the rollers with the ground or, in other words, it is not necessary that all of the rollers should be engaged with the ground at the same time in order that they may be turned. This operating mechanism is provided so that in case one or two of the rollers should be out of engagement with the ground, as when passing over a hollow or depression, they will still continue to operate and engage any clods or lumps of dirt lying in their path of movement.

In connection with the front and intermediate rollers 21, I provide a series of rake teeth 28, which are preferably in the form of rearwardly and downwardly curved spring metal bars, the upper ends of which are rigidly bolted or otherwise secured to shafts 29 arranged between the side and center bars of the frame and having their outer ends journaled in bearing brackets 30 arranged on the frame as shown. Secured to the shafts 29 adjacent to the inner ends are upwardly projecting crank arms 31. The crank arms 31 of the front and center rollers are secured together by connecting bars 32, and said bars are connected by links 33 to an operating lever 34 which is pivotally mounted in a suitable bearing bracket on the upper center bar 6 of the frame. The links 32 are provided at their inner ends with a series of bolt holes 35 whereby they may be adjustably connected with the lever 34. By means of the lever 34, the shafts 29 may be rocked in one direction or the other thereby swinging the teeth 28 connected thereto upwardly or downwardly out of or into operative position. In order to hold the teeth 28 in the desired position, I provide a segmental locking rack 36, in which is formed a series of apertures 37 with one of which and with the lever 34 is adapted to be engaged a locking pin 38, whereby the lever may be secured at any desired position for holding and supporting the spring teeth in the desired position. Loosely connected in any suitable manner to the outer side of the front cross bar 3 of the frame is a centrally disposed draft tongue 39, and with said bar 3 between the tongue connection and the outer ends of the bar are connected the inner ends of draft chains 40, on the outer ends of which are arranged hooks 41 which are adapted to be slidably engaged with the draft bale 42 arranged on the under side of the tongue and secured thereto as shown.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:—

In a clod crusher, a supporting frame, a series of clod crushing rollers revolubly mounted in said frame, means to operatively connect said rollers together, a series of frame supporting standards slidably mounted in said frame, a series of supporting wheels journaled on the lower ends of said standards, studs extending laterally outward from said standards, operating bars fulcrumed on said frame intermediate of their ends and having their outer ends slotted and engaged with said studs, an arm extending upwardly from the inner end of said bars and provided with a laterally extending stud, the inner end of the other bar being slotted and engaged with the stud on said arm, and an operating lever fulcrumed on said frame and connected with said arm for raising and lowering said wheels.

In testimony whereof I have hereunto set my hand in presence of two subscribing witnesses.

JASON S. DONNELLY.

Witnesses:
W. I. BRACY,
GEO. P. BURKER.